United States Patent [19]

Leone et al.

[11] 3,958,026
[45] May 18, 1976

[54] DISINFECTION AND STERILISATION OF MUSSELS, CRUSTACEA AND FISH

[75] Inventors: Luigi Leone, Valencia, Spain; Fulvio Casagrande, Binningen, Switzerland

[73] Assignee: Ciba-Geigy Corporation, Ardsley, N.Y.

[22] Filed: Sept. 11, 1974

[21] Appl. No.: 505,107

[30] Foreign Application Priority Data
Sept. 14, 1973 Switzerland........................ 13271/73

[52] U.S. Cl.............................. 426/332; 426/335
[51] Int. Cl.² ............................................. A23B 4/02
[58] Field of Search .......... 426/151, 326, 331, 335, 426/332, 641, 643, 644, 647; 424/80

[56] References Cited
UNITED STATES PATENTS

| | | | |
|---|---|---|---|
| 2,706,701 | 4/1955 | Beller et al. | 424/80 |
| 2,739,922 | 3/1956 | Shelanski | 424/80 |
| 3,028,300 | 4/1962 | Cantor et al. | 424/80 |
| 3,545,982 | 12/1970 | Nakatani et al. | 426/331 X |
| 3,600,198 | 8/1971 | Gonthier et al. | 426/335 |

*Primary Examiner*—A. Louis Monacell
*Assistant Examiner*—Robert J. Warden
*Attorney, Agent, or Firm*—Harry Falber; Frederick H. Rabin

[57] ABSTRACT

Use of an iodophor composition containing iodine bound in complex linkage with polyvinylpyrrolidone for disinfection and sterilisation of mussels, Crustacea and fish.

10 Claims, No Drawings

DISINFECTION AND STERILISATION OF MUSSELS, CRUSTACEA AND FISH

The present invention relates to the use of iodophor preparations based on polyvinylpyrrolidone for disinfection and sterilisation of mussels, Crustacea and fish, as well as to a process for disinfection, sterilisation and improvement of the preserving of these sea creatures.

After being caught, mussels, Crustacea and fish are normally subjected, during breeding, in the course of processing and during transport, to a lesser or greater degree to antimicrobially effective treatments. The purpose of these measures is to disinfect, sterilise and/or preserve the sea produce in order that the quality thereof is perfectly satisfactory with regard to its use as food. In view of the continually increasing contamination of the seas and inland waters, particularly near to coasts, combined with the danger of infections (e.g. as a result of enterobacteriaceae, such as coliform germs or salmonella, vibrionen, such as *Vibrio cholerae* or *Vibrio parahaemolyticus*, as well as strains of viruses), these measures have become of greater importance, and indeed a necessary requirement, e.g. in the case of mussels, if the sea produce is to be enjoyably eaten or further processed.

It is known that mussels, Crustacea and fish are treated with solutions of substances splitting off chlorine in order to disinfect and preserve the said sea produce and to thus provide protection thereof against the propagation of bacteria and to prevent further contamination. (See A. B. Melvin, "Disinfection", M. Dekker Inc., New York 1970; pp. 380–391; G. Borgstrom, "Fish and Food", Academic press, New York-London, 1965, Vol. IV, chap. 2:25). Thus, for example, the sea creatures can be transported, stored and further processed under the action of chlorinated water or in curing brines. It is also known that these creatures can be treated, preferably immediately after they have been caught, with solutions of antibiotically active compounds (see J. D. Syme, "Fish and Fish Inspection", H. K. Lewis Ltd., London 1966, pp. 179–183). Furthermore, chlorine-releasing substances and antibiotics have been frozen together with ice, which was then used for the cooling of the catches. In order to sterilise edible mussels, e.g. oysters, they are usually kept in the living state for a few days in sea water which has been previously rendered germ-free by chlorination. It has also already been suggested that the water in which the Mollusca are kept be sterilised beforehand by means of ozone or with the aid of UV-irradiation, in order to avoid the undesirable chlorination (see J. D. Syme, "Fish and Fish Inspection", 1966, pp. 117–121).

The aim of the present invention is to provide a sterilisation system and a corresponding process to sterilise, quickly and effectively, mussels, Crustacea and fish, both in the living and the dead state, without at the same time changing the organoleptic characteristics of this sea produce.

In the case of the hitherto applied processes for sterilisation of mussels, Crustacea and fish, the treatment with chlorine-releasing substances has proved particularly disadvantageous, because the sea foods treated in this manner are practically never free from the taste and smell of chlorine. Moreover, the disinfection effect with the use of chlorine or chlorine products is not always satisfactory, since the action can easily be impaired by contamination resulting from organic material. For these reasons, therefore, there is an attempt to avoid where possible the use of chlorine products for the direct sterilisation of fish, Crustacea and mussels. The use too of broad spectrum antibiotics for the purposes mentioned is questionable by virtue, in particular, of the greatly increasing formation of resistant strains of microorganisms (see G. Borgstrom, "Fish and Food". Academic Press, New York and London, 1965, Vol. I, pp. 504–505). These aspects as well as general legal prohibitions concerning the application of antibiotics in foodstuffs have prevented the use of these active substances on a wider basis.

The sterilisation of Mollusca by the hitherto known procedures has posed particular problems. The above-mentioned disinfection of the water in which the creatures have to be kept alive for an appreciable length of time requires a practically complete removal of the chlorine in order that the physiological activity of the creatures is not impaired. If the removal of chlorine is not complete, there occurs no cleansing circulation of water within the creatures. However, chlorine removal renders necessary expensive equipment and a considerable amount of delay. Where ozone or UV-irradiation is to be used for sterilisation of the water in which the creatures are kept, waiting times of up to 3 days are necessary in order to improve in a satisfactory manner the bacteriological quality of the Mollusca being treated. On account of the length of time the creatures are held in the washing tanks, the capacity of the plant and of the containers has to be very large, so that there inevitably results a complicated and uneconomic method of operation with high maintenance costs. It may be mentioned, in particular, that in the above-mentioned methods for sterilisation of living Mollusca there occurs in no instance a direct antimicrobial treatment but simply a washing of the creatures with the previously sterilised water.

The disadvantages of the processes hitherto known for the sterilisation of mussels, Crustacea and fish are to a great extent eliminated by the present invention. The addition of iodophor compositions suggested according to the invention as sterilising and disinfecting agents ensures a direct, complete and, from a foodstuffs and toxicological point of view, optimum sterilisation of the sea produce; moreover, dangerously pathogenic microorganisms, such as enterobacteriaceae, vibrionen and viruses, are rendered harmless.

Application of the iodophors used according to the invention is not associated with any impairment of the smell or taste of the sea produce treated, and it is also ecologically harmless. From the technological point of view, the simplicity of adding in controlled doses the iodophors suggested according to the invention, the uncomplicated nature of the necessary plant, of which the capacity can be fully utilised, and the easy servicing thereof have proved particularly advantageous. For the sterilisation of living mussels, it is especially important that the iodophors used according to the invention do not cause any disturbance of the physiological functions of the living creatures. The normal metabolism of the creatures, particularly their circulation of the breathing water, is maintained during the entire period of sterilisation. The iodophors suggested according to the invention also permit of a direct treatment of deep-frozen fish which are to be thawed, with the normally extremely severe increase in the number of germs being prevented. The iodophors used according to the invention can with advantage also be added to the washing water tanks or brine tanks in the course of the preparation of preserved (canned) fish. The iodophors used according to the invention have likewise proved satisfactory as an additive to ice which is to be used for cooling purposes in the fish-processing industry.

According to the invention, there is suggested the use of an iodophor composition containing iodine bound in complex linkage with poly-N-vinylpyrrolidine for the disinfection and sterilisation of mussels, Crustacea and fish, particularly edible mussels. For the purposes of the invention, the use of an iodophor composition containing iodine, polyvinylpyrrolidone and a substance releasing iodide ions is preferred. Iodophor compositions which have proved particularly suitable are those having a weight ratio of polyvinylpyrrolidone to iodine of 3:1 to 10:1, a quantitative proportion of iodide corresponding to a weight ratio of iodide to iodine of at least 2:1 and a value of the distribution coefficient (D.C.) in an aqueous solution, which solution corresponds to a concentration of available iodine of 1 per cent by weight, of over 200, determined by the equation $$D.C. = \frac{\text{mg of iodine in aqueous phase}}{\text{mg of iodine in heptane}} \cdot \frac{\text{ml heptane}}{\text{ml aqueous phase}}$$

with the composition containing, as the substance releasing iodide ions, preferably hydriodic acid or an iodide, e.g. potassium iodide or sodium iodide.

The invention also relates to a process for disinfection and sterilisation of mussels, Crustacea and fish, wherein the living creatures are treated in an aqueous medium with one of the iodophor compositions as described in the foregoing, with a concentration of available iodine of at least 0.1 ppm, preferably 0.1–12 ppm, and particularly 0.2–0.5 ppm, relative to the weight of the aqueous medium, being maintained. If the process is applied to living edible mussels, the concentration of available iodine maintained is preferably 0.1–5 ppm, especially 0.1–0.4, relative to the weight of the aqueous medium.

The process of the invention is advantageously performed using a procedure whereby the aqueous medium, optionally with the incorporation of cleansing and aeration equipment, is fed back in a circulation system, with the addition of the iodophor composition in controlled amounts being made in such a manner that the required concentration of available iodine in the aqueous medium is maintained at the desired level. The procedure can however be such that the aqueous medium is continuously supplied and then drawn off, with the content of available iodine being kept at the desired level likewise be means of dosing devices.

The iodophor compositions suitable for the purposes of the invention are known, or they can be prepared by processes known per se. Such iodophors based on polyvinylpyrrolidone are described, for example, in the Swiss Patent Specification No. 304876, as well as in the U.S. Pat. Nos. 2,706,701 and 2,739,922. The use of iodophors of which the preparation is described in the U.S. Pat. No. 3,028,300 has proved particularly advantageous for the purposes of the invention. In this patent specification, the previously mentioned distribution coefficient (D.C.) is likewise dealt with.

For application in connection with the present invention, it is possible to use both liquid and solid polyvinylpyrrolidone iodophor compositions, which in each case have to be appropriately diluted to give aqueous working solutions having the prescribed concentration of available iodine. The employed aqueous solutions can contain conventional auxiliaries and additives that are compatible with the iodophor, e.g. buffer substances such as phosphates, solubility-promoting agents such as alcohols, preferably ethanol or propanols, inorganic acids such as phosphoric acid or acid sulphates, or organic acids such as citric acid, tartaric acid, lactic acid, acetic acid, hydroxyacetic acid, aconitic acid, succinic acid or sorbic acid. These additives must obviously not be toxic, and should have no disadvantageous physiological effects on the living creatures being treated by application of the measures according to the invention. In general, the iodophor preparations used according to the invention can contain alcohols in an amount of 2 to 12% by weight, preferably 4 to 6% by weight; and organic acids in an amount of 5 to 30% by weight, preferably 10 to 15% by weight.

The measures suggested according to the invention are suitable, on account of the non-toxicity of the suggested iodophor compositions, for sterilisation and disinfection both of dead and of living mussels, Crustacea and fish, and can be used at all stages of processing and transport. The application of the invention has proved especially advantageous for the sterilisation of living mussels, such as edible mussels, oysters, pectines, Venus mussels, 'Herzmuscheln' and abalones. Also all types of edible fish or the meat thereof, such as sardines, mackerel, herrings, tunny fish, flat-fish (plaice), etc., and Crustacea, such as crabs, lobsters, prawns, crayfish, etc., can be successfully disinfected and sterilised by the process of the invention. In order to keep sea produce fresh for a longer time, e.g. on the fishing vessels, and also to thaw out deep-frozen fish, it is possible to use ice prepared with the addition of the aforementioned iodophor preparations, and also water containing the stated iodophor preparations.

The duration of the disinfection or sterilisation process according to the invention depends on the various conditions, e.g. on the external temperature, access of air and on the degree of the original microbial contamination of the produce to be sterilised. By virtue of the very rapid action of the polyvinylpyrrolidone iodophors, however, only very short treatments with the solutions to be used according to the invention are generally necessary. In the case of freshly caught fish, a treatment time of 15 minutes to 3 hours is sufficient to obtain a disinfection action and the elimination of pathogenic microorganisms; already stored produce requires a treatment time of about 1 to 4 hours. A treatment time of about 3 to 12 hours, preferably 7 to 10 hours, is necessary for the sterilisation of living mussels.

In principle, no special equipment is necessary for carrying out the process according to the invention for disinfection and sterilisation of the aforementioned sea produce. Living creatures must have sufficient freedom of movement in the tanks filled with the aqueous treatment medium, and, in particular, they must have an adequate supply of air to breath, which can be supplied with the aid of known aeration systems. For living mussels, the ratio of the volume of treatment solution, in which the creatures are kept, to the amount by weight of the creatures to be disinfected or sterilised is about 2:1 to 10:1, preferably 5:1. In the case of treatment on a larger scale, the use of dosing devices for the purpose of effecting a regular and uniform addition of the iodophor preparation is recommended, as well as, optionally, the feeding-back of the aqueous treatment medium in a circulation system, with the installation of cleaning stages for the continuous removal of mechanical impurities. In the case of unfavourable climatic conditions, there should be maintained in the tanks containing the treatment liquid a temperature at which, on the one hand, the iodine losses due to evaporation are low and which, on the other hand, approaches the optimum temperature for the living creatures. Treatment temperatures of 8° to 24°C, preferably 16° to 21°C, have been shown to be advantageous.

EXAMPLE 1

In the preparation of preserved (canned) fish, parts of sardines (*Sardinia pilchardus*) standing in open tins are washed, before the boiling process, in a washing plant with water, in order to remove the excess of added brine. The washing water becomes severely polluted in this operation and correspondingly contaminated by microorganisms.

There was introduced into a washing plant as described above, with a washing-water content of 1.2 m³, 1800 ml of a liquid iodophor preparation obtained by a brief intimate mixing together of the following constituents at about 60°C:
1.9% by weight of elementary iodine,
1.5% by weight of HI (47%),
4.0% by weight of isopropanol,
15.0% by weight of polyvinylpyrrolidone,
15.0% by weight of citric acid,
water up to 100%.

A parallel washing plant without iodophor addition to the water was used as a control. The washing temperature in both plants was 21°C. The washing plants were operated for one hour in the normal working sequence. After this time, the washing water was subjected in each case to a bacteriological analysis. The washing water in the control plant showed a severe, from a hygienic point of view undesirable, contamination with microorganisms, whereas the plant operated with the iodophor addition showed only 0.25% of the number of germs of the control plant, that is to say, it can be considered practically as being sterilised. The organoleptical examination of the tinned fish produce treated in this manner showed, after the boiling process and after sterilisation, no differences in taste between the treated and untreated products.

EXAMPLE 2

The following solid iodophor compositions 1 to 5 were prepared according to the U.S. Pat. No. 2,706,701 by mixing and heating the constituents at 95°C;

Table I

| Composition No. | added iodine in g | added PVP in g |
|---|---|---|
| 1 | 50 | 100 |
| 2 | 37 | 100 |
| 3 | 30 | 100 |
| 4 | 22 | 100 |
| 5 | 19 | 100 |

With these compositions 1 to 5 there were prepared aqueous solutions of 5% by weight, which were then added, in the manner described in Example 1, in each case in such amounts to the washing plant that with 3 different charges there were obtained concentrations of 20, 30 and 50 ppm of available iodine in the washing water.

In all cases, a bacteriological examination showed already after 60 minutes a reduction of at least 98% in the number of germs in the treated washing water compared with the number in the untreated washing water, and an optimum foodstuff quality of the finished canned produce.

EXAMPLE 3

Ice was prepared from water to which had been added 0.15% by weight of the iodophor composition used in Example 1. 10 kg of freshly caught sardines (*Sardina pilchardus*) was bedded, in a container, into the ice prepared as above. A corresponding sample without addition of iodophor was used as a control. The two samples were left for 24 hours at room temperature. The temperature in the ice-fish mixture was on average 0.7°C. The water running off was examined bacteriologically at hourly intervals, and the number of germs determined. Already after 2 hours, a value was measured in the water containing iodophor which amounted to only 0.06% of the number of germs originally present. This value remained essentially unchanged for about 6 hours melting time. The number of germs in the water running off from the untreated control sample, on the other hand, continuously increased and attained after 6 hours values which from a foodstuff aspect were no longer safe.

It was further established that the fish produce preserved as described above had not been impaired, neither organoleptically nor in appearance, by the presence of the preparation containing iodophor.

EXAMPLE 4

Varying portions of finely powdered iodine, dry PVP and powdered iodide were mechanically mixed together according to Example II of the U.S. Pat. No. 3,028,300 in a closed container at 22°C in the amounts given in Table II. After about 24 hours' mixing, the whole of the added elementary iodine was incorporated uniformly in the mixture. Titration showed that between 90 and 95% of the original iodine content was present as available iodine.

Table II

| Composition No. | added iodine in g | added PVP in g | added iodide in g |
|---|---|---|---|
| 1 | 10 | 30 | 60 KI |
| 2 | 10 | 50 | 40 NaI |
| 3 | 10 | 70 | 20 NaI |
| 4 | 10 | 60 | 100 KI |
| 5 | 10 | 50 | 100 KI |
| 6 | 10 | 100 | 50 KI |

The above solid compositions 1 to 6 were dissolved in water so that in each case there was a content of available iodine of 0.005% by weight. Ice was prepared from this water containing iodophor, and this ice was used in the manner described in Example 3 for the preserving of fresh fish. A reduction of the number of germs in the water running off to the extent of 98% with respect to the original value was established after 5 hours, with the fish exhibiting no impairment at all with regard to taste and smell.

EXAMPLE 5

15 kg of living edible mussels (*Mytilus galloprovinicialis*), which came from the water of a port installation and were heavily contaminated with fecal microorganisms, was placed into a tank containing 150 liters of sea water. The tank was provided with a dosing device by means of which controlled amounts of the liquid iodophor composition described in Example 1 were continuously added to the sea water in such a manner that a content of available iodine of 0.5 ppm was permanently ensured. Furthermore, the water was being aerated by means of filter candles (about 150 l of air per hour). The water temperature during the test was 18°C. The mussels were subjected to treatment for 8 hours. The living mussels were afterwards kept with aeration, but without further iodophor additions, for 24 hours in the same water. During the entire treatment, the creatures showed the full vital activity and continued their circulation of breathing water without interruption. None of the creatures was observed to have died.

At the intervals of time shown in Table III, 10 mussels were removed in each case and the flesh of the mussel was bacteriologically examined with use of the normal dilution series, the examination being with respect to the total number of germs and the number of coli-bacteria. The following results were obtained.

Table III

| Removal of test mussels after | Total number of germs per g of mussel flesh | Number of coli-bacteria per g of mussel flesh |
| --- | --- | --- |
| 1 hour | $1.8 \times 10^3$ | $4 \times 10^1$ |
| 2 hours | $1.8 \times 10^3$ | $4 \times 10^1$ |
| 3 hours | $5.8 \times 10^2$ | $1 \times 10^1$ |
| 4 hours | $3.5 \times 10^2$ | $1 \times 10^1$ |
| 5 hours | $2.2 \times 10^2$ | 0 |
| 6 hours | $2.0 \times 10^2$ | 0 |
| 7 hours | $3.1 \times 10^2$ | 0 |
| 8 hours | $2.6 \times 10^2$ | 0 |
| 24 hours | $2.9 \times 10^2$ | 0 |

After 9 hours total treatment time, the mussels were in a fully satisfactory condition from a foodstuff-technical and organoleptic point of view.

EXAMPLE 6

The procedure of Example 5 was repeated with a fresh batch of freshly caught edible mussels, with the exception that in the sea water, in which the edible mussels were kept, a content of available iodine of 0.3 ppm was maintained.

Table IV

| Removal of mussels after | Total number of germs per g of mussel flesh | Number of coli-bacteria per g of mussel flesh |
| --- | --- | --- |
| 1 hour | $2.6 \times 10^3$ | $1 \times 10^1$ |
| 2 hours | $1.6 \times 10^3$ | $1 \times 10^1$ |
| 3 hours | $3.1 \times 10^2$ | 0 |
| 4 hours | $2.9 \times 10^2$ | 0 |
| 5 hours | $2.0 \times 10^2$ | 0 |
| 6 hours | $2.0 \times 10^2$ | 0 |
| 7 hours | $2.7 \times 10^2$ | 0 |
| 8 hours | $2.0 \times 10^2$ | 0 |

EXAMPLE 7

The procedure of Example 5 was repeated with the exception that, instead of living edible mussels, living oysters were used. The results were similar to those in Example 5. After 2–3 hours' treatment, the oysters (mussel flesh) no longer showed any infestation of colibacteria.

EXAMPLE 8

The procedure of Example 5 was repeated (batch A). There was used as a comparison an identical plant (batch B) which however was operated without a iodophor addition, but was provided with a circulation system for water. After the edible mussels had been placed in the tank of batch B, the circulation system was connected to an ozonizer producing 100 mg of ozone per hour. The water treated with ozone was fed back continuously in a circulation system.

At regular intervals of time, 10 mussels were taken each time from each batch, and the mussel flesh was examined to determine the total number of germs and the number of coli bacteria present.

Whereas the mussels from batch A showed no coli bacteria after 5 hours, the mussels from batch B still showed a contamination with coli bacteria which was unsafe from a foodstuff-technical point of view (number of germs > 10 germs per g of mussel flesh).

EXAMPLE 9

1500 kg of living edible mussels (*Mytilus galloprovincialis*), which had come from a breeding installation and which were severely contaminated with microorganisms of, in many cases, fecal origin, were transferred to a tank containing 25,000 liters of sea water. Sea water taken directly from the sea flowed at a rate of 300 liters per minute through the tank. The tank was fitted with a dosing device, with the aid of which the liquid iodophor composition described in Example 1 was added in controlled amounts to the sea water in such a manner that a content of available iodine of 0.2 ppm in the sea water was continuously maintained. The water temperature during the test was 21°C. The treatment of the mussels was continued for 8 hours.

During the entire duration of the test, the mussels exhibited their full vital activity and maintained their circulation of breathing water without interruption. It was not observed that any of the mussels died. At the intervals of time given in Table V, 15 mussels in each case were removed and the mussel flesh was bacteriologically examined with use of the usual dilution series in order to determine the total number of germs and the number of coli bacteria. The following results were obtained:

Table V

| Removal of test mussels | total number of germs per g of mussel flesh | Number of coli bacteria per g of mussel flesh |
| --- | --- | --- |
| immediately (before the treatment) | $9.8 \times 10^4$ | $5.0 \times 10^4$ |
| 2 hours | $3.0 \times 10^2$ | $1.5 \times 10^2$ |

Table V-continued

| Removal of test mussels | total number of germs per g of mussel flesh | Number of coli bacteria per g of mussel flesh |
| --- | --- | --- |
| 6 hours | $1.0 \times 10^2$ | $2.0 \times 10^1$ |
| 8 hours | $2.2 \times 10^2$ | $2.5 \times 10^1$ |

The originally severely contaminated mussels showed after a total treatment time of 8 hours a significant reduction of the number of germs and they were organoleptically perfect.

EXAMPLE 10

In each case, 3 kg of deep-frozen mackerel was placed into water (initial temperature about 20°C) with the addition of the iodophor preparation described in Example 1. Untreated control batches without an addition of iodophor were subjected to the same treatment.

The amount of available iodine present in the solution used was 12 ppm. The fish were treated for 4 hours until complete thawing had occurred.

At the commencement and at the end of the test, the surface of the fish, i.e. the skin of the fish, and also the water were bacteriologically examined. Table VI shows the sterilising effect of the iodophor preparation on the treatment water and on the surface of the fish.

After the treatment, the fish showed no change with respect to their appearance and their organoleptic characteristics.

Table VI

| Removal of specimens | Total number of germs per g of fish skin | Number of coli-bacteria per g of fish skin | Total number of germs per ml of water | Coli-bacteria per ml of water |
| --- | --- | --- | --- | --- |
| Before the treatment | $4.5 \times 10^3$ | $2.1 \times 10^2$ | 1 | 0 |
| After treatment with jodophor addition | $1.9 \times 10^3$ | 8 | 2 | 0 |
| Untreated control at start of test | $5.2 \times 10^3$ | $4.7 \times 10^1$ | 1 | 0 |
| Untreated control at end of test | $10 \times 10^4$ | $2.6 \times 10^2$ | 21 | 4 |

Whereas in the case of the untreated control fish there was shown to be an appreciable increase of the number of coli bacteria, the corresponding number of germs in the case of the specimens thawed with the iodophor addition was markedly decreased. As can be seen, the effect extended also to the bacteriological quality of the water.

What we claim is:

1. A method for disinfecting and sterilizing living mussels, Crustacea and fish which comprises contacting said living creatures, in an aqueous medium, with a disinfecting and sterilizing amount of a complex of iodine, polyvinylpyrrolidone and an iodide ion-releasing compound.

2. The method according to claim 1, wherein said complex has a weight ratio of polyvinylpyrrolidone to iodine of 3:1 to 10:1, a quantitative proportion of iodide corresponding to a weight ratio of iodide to iodine of at least 2:1 and a value of the distribution coefficient (D.C.) in an aqueous solution, which solution corresponds to a concentration of available iodine of 1% by weight, of over 200, determined by the equation $$D.C. = \frac{\text{mg of iodine in aqueous phase}}{\text{mg of iodine in heptane}} \cdot \frac{\text{ml of heptane}}{\text{ml of aqueous phase}}$$

3. The method according to claim 1 wherein said iodide ion-releasing compound is selected from the group consisting of hydroiodic acid and an alkali metal iodide.

4. The method according to claim 1, wherein said complex provides a concentration of available iodine of from about 0.1–12 ppm, relative to the weight of the aqueous medium.

5. The method according to claim 4 wherein the concentration of available iodine is from about 0.1 to 5 ppm relative to the weight of the aqueous medium.

6. The method according to claim 5, wherein the concentration of available iodine is from about 0.1 to 0.4 ppm relative to the weight of the aqueous medium.

7. The method according to claim 4, wherein living edible mussels are contacted.

8. In the method of contacting mussels, Crustacea, fish and the meat thereof with effective amounts of liquid disinfecting and sterilizing compositions, the improvement comprising treating the said sea-products with an aqueous solution of an iodophor composition consisting essentially of iodine, polyvinylpyrrolidone, an iodide-ion-releasing compound, an alcohol selected from the group consisting of ethanol, n-propanol and isopropanol, and an organic acid selected from the group consisting of citric acid, tartaric acid, lactic acid, acetic acid, hydroxy-acetic acid, aconitic acid, succinic acid and sorbic acid.

9. The method according to claim 8, wherein said composition has a weight ratio of polyvinylpyrrolidone to iodine of 3:1 to 10:1, a quantitative proportion of iodide corresponding to a weight ratio of iodide to iodine of at least 2:1, a value of the distribution coefficient (D.C.) in an aqueous solution, which solution corresponds to a concentration of available iodine of 1 per cent by weight, of over 200, determined by the equation $$D.C. = \frac{\text{mg of iodine in aqueous phase}}{\text{mg of iodine in heptane}} \cdot \frac{\text{ml of heptane}}{\text{ml of aqueous phase}}$$

an alcohol concentration of from about 2 to 12%, by weight, and an acid concentration of from about 5 to 30%, by weight.

10. The method according to claim 9, wherein said iodide ion-releasing compound is selected from the group consisting of hydroiodic acid and alkali metal iodides.

* * * * *